Aug. 1, 1961 J. A. GAYLORD 2,994,131
HOLE CENTERING TOOL
Filed June 30, 1958
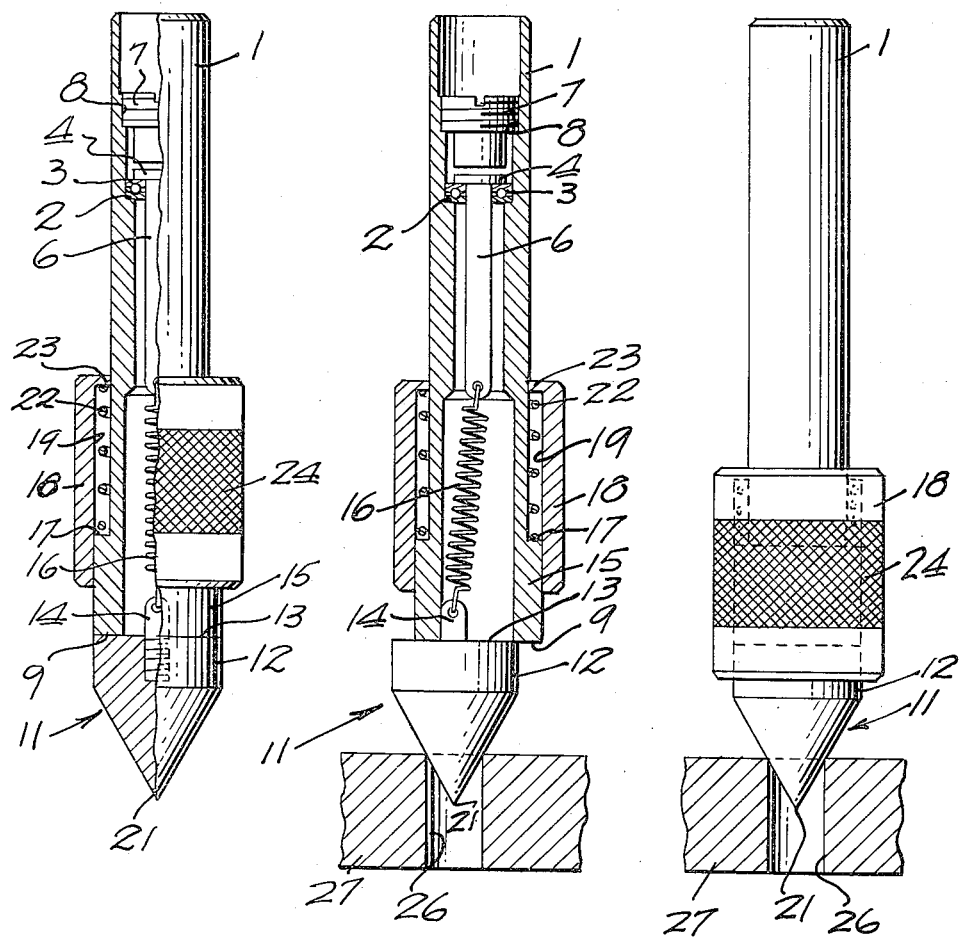
INVENTOR.
JOHN A. GAYLORD
BY George B. White
ATTORNEY

United States Patent Office 2,994,131
Patented Aug. 1, 1961

2,994,131
HOLE CENTERING TOOL
John A. Gaylord, 360 Quietwood St., San Rafael, Calif.
Filed June 30, 1958, Ser. No. 745,641
3 Claims. (Cl. 33—185)

This invention relates to a hole centering tool.

The primary object of this invention is to provide a positive centering tool whereby a hole in the work may be centered relatively to the center or axis of a rotating spindle or shaft of the machine, which performs certain operations on or in the hole of the work.

Particularly it is an object of the invention to provide a centering tool for aligning a hole in the work with the axis of the spindle of a machine positively and accurately so as to eliminate minute errors of alignment which may occur when such aligning is done by sight.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a partly sectional view of the hole centering tool.

FIG. 2 is a sectional view showing the position of the parts of the tool before the hole in the work is aligned with the axis of a spindle, and FIG. 3 is a view showing the positive aligning position of the aligning sleeve of the tool.

My aligning tool has a tubular shank 1. Inside the tubular shank is formed a shoulder 2 on which is a ball bearing assembly 3. On the ball bearing assembly 3 rests the head 4 of a spring supporting pin 6 so that the pin 6 extends toward the point of the tool. A cap 7 is screwed into a threaded portion 8 of the shank 1 so as to hold the head 4 of the pin 6 against accidental removal from the shank 1.

Against the tip end 9 of the shank 1 is mounted a hole centering point 11. This centering point 11 is conical with a cylindrical base 12 the bottom face 13 of which bears against the tip end 9 of the shank 1. In the center of the cylindrical base 12 is threaded a spring pin 14. A coil spring 16 is anchored in the lower end of the pin 6 and at its other end to the upper end of the spring pin 14 so as to normally pull the point 11 up against the tip end 9 of the shank 1.

The portion of the shank 1 adjacent the tip end 9 is wider so as to form a head 15 and a shoulder 17 on the shank 1. Over the shoulder 17 is slidable a sliding sleeve or aligning sleeve 18. The cylindrical inner periphery 19 of the sliding sleeve 18 is in a close sliding fit over the enlarged portion of the shank 1. The said enlarged portion of the shank 1 and the cylindrical base 12 of the point 11 are of exactly the same diameter and are coaxial with the apex 21 of the point 11. In other words, the apex 21 of the point 11 is accurately centered with respect to the conical point 11 as well as the cylindrical base 12 and the axis of the enlarged end of the shank 1, so that when the base 12 and the enlarged portion 13 are accurately aligned, then the apex 21 is accurately centered on the axial center line of the shank 1. For this purpose the shank 1 is fully concentric with the enlarged lower portion of said shank. Therefore, the inner cylindrical periphery 19 of the sliding sleeve 18 is also truly coaxial with the shank 1. A coil spring 22 around the shank 1 bears against the shoulder 17 on the outer periphery of the shank 1 and also against an annular flange 23 extending inwardly around the top of the sliding sleeve 18. In this manner the spring 22 normally urges the sliding sleeve 18 away from the point 11. The outer periphery of the sliding sleeve 18 is provided with suitable knurls 24 to facilitate its positive manipulation.

In operation the shank 1 is clamped in the machine in place of the desired tool for performing work on or in a hole 26 of the work 27 in the machine. This may be accomplished by placing the shank 1 in a suitable chuck. For instance, a boring head or other rotating part as the spindle of a machine tool or a chuck mounted thereon, must be concentric with the center of the hole. For this purpose the shank 1 of the tool is mounted in place of the working tool. As an example of adjustment, the work is tentatively located opposite the hole centering tool. Initially the work may be offset to one side of the axis of the shank, as shown in FIG. 2. The work is shifted until it is centered by sight. Thereupon the aligning sleeve 18 is pulled down into the position shown in FIG. 3 which completes the centering to the accuracy of the fit between the inner periphery of the sliding sleeve 18 with respect to the enlarged portion or head on the tip end of the shank 1 and the base 12 of the point 11. When so centered the work is fixed in position and the centering device is removed and a working tool is substituted in its place to perform the desired operation on or in the accurately aligned hole. The clearance between the bearing cap 7 and the head 4 of the pin 6 allows the pin 6 to rotate and swing with the motion of spring 16 to facilitate alignment.

I claim:

1. In a hole centering device for aligning the work with the tool of a machine, including a tubular shank adapted to be secured in place of said tool of said machine, an enlarged head at an end of said shank, a flat end face on said head, a conical centering point adjacent said head, a base of said point being complemental to the outer periphery of said head, a flat face of said base in sliding contact with the flat face of said head; said centering point, said base and said head being in axial alignment with said shank, and resiliently yieldable means in said shank to hold said base against said head with said flat faces in sliding contact to permit lateral shifting of said base relatively to said head, the improvement of an aligning sleeve snugly fitting over said head and said base for aligning said centering point with the axis of the shank, and resiliently yieldable means normally to urge said sleeve away from said base and over said head.

2. In a hole centering device for aligning the work with the tool of a machine, including a tubular shank adapted to be secured in place of said tool of said machine, an enlarged head at an end of said shank, a flat end face on said head, a conical centering point adjacent said head, a base of said point being complemental to the outer periphery of said head, a flat face of said base in sliding contact with the flat face of said head; said centering point, said base and said head being in axial alignment with said shank, and resiliently yieldable means in said shank to hold said base against said head with said flat faces in sliding contact to permit lateral shifting of said base relatively to said head, the improvement of an aligning sleeve snugly fitting over said head and said base for aligning said centering point with the axis of the shank, and a shoulder on said shank formed by said head, a flange on said sleeve extended inwardly of the sleeve and spaced from said shoulder, and a spring in said sleeve between said shoulder and said flange for normally urging said sleeve over said head and away from said base.

3. The hole centering device defined in claim 1, said resiliently yieldable means in said shank including a pin rotatably suspended and extended axially into and journalled in said shank, a spring anchored at one end thereof to said pin, and means to anchor the other end of the spring in the center of said base so as to draw the flat face of said base against the flat face on the adjacent end of said head.

References Cited in the file of this patent

UNITED STATES PATENTS

| | | |
|---|---|---|
| 869,483 | Dennis et al. | Oct. 29, 1907 |
| 1,233,458 | Fisk | July 17, 1917 |
| 1,252,777 | Casler | Jan. 8, 1918 |
| 1,984,864 | Cole et al. | Dec. 18, 1934 |
| 2,216,766 | Cook | Oct. 8, 1940 |
| 2,451,904 | Beatty | Oct. 19, 1948 |

FOREIGN PATENTS

| | | |
|---|---|---|
| 270,769 | Italy | Jan. 20, 1930 |
| 816,184 | Germany | Oct. 8, 1951 |